US007153913B2

United States Patent
Lautenschlager et al.

(10) Patent No.: US 7,153,913 B2
(45) Date of Patent: *Dec. 26, 2006

(54) SILOXANE POLYMERS CONTAINING SI-BOUND HYDROGEN ATOMS AS ANTIMISTING ADDITIVES FOR SILICONE COATING COMPOSITONS

(75) Inventors: Hans Lautenschlager, Haiming (DE); Reinhard Stallbauer, Gumpersdorf (DE)

(73) Assignee: Wacker Chemie AG, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 39 days.

(21) Appl. No.: 10/506,659

(22) PCT Filed: Feb. 20, 2003

(86) PCT No.: PCT/EP03/01761

§ 371 (c)(1),
(2), (4) Date: Sep. 3, 2004

(87) PCT Pub. No.: WO03/074591

PCT Pub. Date: Sep. 12, 2003

(65) Prior Publication Data

US 2005/0101679 A1 May 12, 2005

(30) Foreign Application Priority Data

Mar. 7, 2002 (DE) ................. 102 10 014

(51) Int. Cl.
*C08L 83/05* (2006.01)
*C08K 5/5419* (2006.01)

(52) U.S. Cl. ................. 525/478; 525/477; 528/15; 528/25; 528/31; 528/32; 524/268

(58) Field of Classification Search .............. None
See application file for complete search history.

(56) References Cited

U.S. PATENT DOCUMENTS

| 5,241,034 A | 8/1993 | Herzig et al. |
|---|---|---|
| 5,691,435 A | 11/1997 | Herzig et al. |
| 5,760,145 A | 6/1998 | Herzig et al. |
| 6,034,225 A | 3/2000 | Weidner et al. |
| 6,093,782 A * | 7/2000 | Herzig et al. ............. 528/15 |
| 6,265,497 B1 | 7/2001 | Herzig |
| 6,274,962 B1 | 8/2001 | Kliman |
| 6,489,407 B1 * | 12/2002 | Clark et al. ............ 525/478 |
| 6,764,717 B1 * | 7/2004 | Herzig et al. ............ 427/387 |
| 2003/0055194 A1 | 3/2003 | Herzig et al. |

FOREIGN PATENT DOCUMENTS

| DE | 195 22 144 A1 | 1/1997 |
|---|---|---|
| DE | 196 29 053 A1 | 1/1998 |
| EP | 0 716 115 A2 | 6/1996 |
| EP | 1 277 786 A1 | 1/2003 |
| WO | WO 01/98418 A2 | 12/2001 |
| WO | WO 01/98420 A2 | 12/2001 |

OTHER PUBLICATIONS

English Derwent Abstract AN 1998-087924 (19) corresp. to DE 196 29 053.
English Derwent Abstract AN 1997-053209 (06) corresp. to DE 195 22 144.

* cited by examiner

*Primary Examiner*—Marc S. Zimmer
(74) *Attorney, Agent, or Firm*—Brooks Kushman P.C.

(57) ABSTRACT

Branched organopolysiloxanes prepared by reacting an organic compound having minimally three aliphatically unsaturated groups with a stoichiometric excess of an organopolysiloxane having terminal Si-bonded hydrogen is effective as an antimisting additive in the high speed coating of substrates with silicone compositions. The antimisting additives may also be equilibrated with linear, branched, or cyclic organopolysiloxanes.

18 Claims, No Drawings

SILOXANE POLYMERS CONTAINING SI-BOUND HYDROGEN ATOMS AS ANTIMISTING ADDITIVES FOR SILICONE COATING COMPOSITONS

BACKGROUND OF THE INVENTION

1. Field of the Invention

The invention relates to the use of antimisting additives for reducing the formation of aerosol in crosslinkable silicone coating compositions.

2. Description of the Related Art

A trend within the silicone coating industry is to increase machine speed in order to raise productivity. Where silicone coatings are applied to the substrate at relatively high speeds, of more than 300 m/min, for example, fine spray mists of the silicone coating system may be formed. This aerosol is formed at the silicone applicator unit. The formation of this spray mist proves to be a serious problem in the context of further increases in the coating speed.

The formation of this spray mist can be reduced by adding what are known as antimisting additives to the silicone coating system.

EP-A 716 115 (Dow Corning Corp.) describes antimisting additives obtained by reacting an organosilicon compound, a compound containing oxyalkylene groups, and a catalyst. The addition of these oxyalkylene-functional reaction products to crosslinkable silicone coating systems reduces the formation of aerosol in rapid coating processes.

WO 01/98418 (Dow Corning Corp.) discloses a liquid silicone antimisting composition, which is obtained by reacting a) an organohydropolysiloxane having at least three Si—H groups (SiH) with
b) a compound having at least 2 alkenyl groups (C═C) in
c) the presence of a platinum catalyst and if desired
d) an inhibitor in a ratio of SiH/C═C≧4.6.

An extremely large excess of organohydropolysiloxane (SiH) is necessary in order to prevent gelling. This excess influences the release properties of the base system, the crosslinkable silicone coating composition. Furthermore, an inhibitor has to be added to prevent gelling.

U.S. Pat. No. 6,265,497 (Wacker-Chemie GmbH) describes siloxane copolymers containing Si-bonded hydrogen atoms as an intermediate in the preparation of alkenyl-functional siloxane copolymers which are branched and whose organopolysiloxane blocks are linked by hydrocarbon bridges.

An object of the invention was to provide antimisting additives for silicone coating compositions which reduce the formation of aerosol in rapid coating processes, which are readily miscible with the silicone coating compositions, and which do not impair the silicone coating compositions. These and other objects are achieved by including in the coating composition antimisting additives prepared by reacting a compound having minimally three aliphatic double bonds with an organosiloxane having terminal Si-bonded hydrogen atoms, in the presence of a hydrosilylatin catalyst, and optionally equilibrating with further linear, branched, or cyclic organopolysiloxanes.

DETAILED DESCRIPTION OF THE PREFERRED EMBODIMENT(S)

The invention provides for the use of antimisting additives in crosslinkable silicone coating compositions for reducing the formation of aerosol, which comprises using as antimisting additives siloxane copolymers containing Si-bonded hydrogen atoms preparable by reacting a compound (1) containing at least three aliphatic double bonds, of the general formula $$R^2(CR^3\!=\!CH_2)_x \qquad (1)$$

where $R^2$ is a trivalent or tetravalent hydrocarbon radical preferably having from 1 to 25 carbon atoms per radical, which can contain one or more mutually separate heteroatoms selected from the group consisting of oxygen, silicon and titanium, $R^3$ is a hydrogen atom or an alkyl radical having from 1 to 6 carbon atoms per radical, and x is 3 or 4 with an organosiloxane (2) having terminal Si-bonded hydrogen atoms in the presence of catalyst (3) which promotes the addition of Si-bonded hydrogen onto aliphatic double bond, the ratio employed of Si-bonded hydrogen in the organosiloxane (2) to aliphatic double bond in organic compound (1) being from 1.3 to 10, and optionally in a second step equilibrating the resulting siloxane copolymers, containing Si-bonded hydrogen atoms, with organopolysiloxane (4), selected from the group consisting of linear organopolysiloxanes containing terminal tri-organosiloxy groups, linear organopolysiloxanes containing terminal hydroxyl groups, branched organopolysiloxanes optionally containing hydroxyl groups, cyclic organopolysiloxanes and copolymers comprising diorganosiloxane and monoorganosiloxane units.

The siloxane copolymers containing Si-bonded hydrogen atoms and their preparation are described in the above-cited U.S. Pat. No. 6,265,497, and U.S. Pat. No. 6,265,497 (incorporated by reference) is therefore part of the disclosure content of this specification.

The antimisting additives of the invention, the alkenyl-functional siloxane copolymers, have the advantage that they not only reduce the formation of aerosol by crosslinkable silicone coating compositions in rapid coating systems but also, in particular, can be mixed in any desired proportions, homogeneously, with the crosslinkable silicone coating compositions, unlike the antimisting additives containing polyglycol groups from the above-cited EP-A 716 115.

Moreover, the antimisting additives of the invention have no inhibiting effect and they are storage-stable. The antimisting additives according to the invention have the advantage that they can be mixed beforehand with the crosslinker component (B) of the crosslinkable silicone coating composition. They are consequently easy to handle and do not impair the release properties of the base system, the crosslinkable silicone coating composition.

The siloxane copolymers of the invention containing Si-bonded hydrogen atoms preferably possess a viscosity of from 2 to 500,000 Pa·s at 25° C., more preferably from 10 to 100,000 Pa·s at 25° C., particularly preferably from 20 to 10,000 Pa·s at 25° C.

One preferred version in the case of very viscous siloxane copolymers is the preparation of the siloxane copolymers of the invention containing Si-bonded hydrogen atoms in inert organic solvents, preferably hydrocarbons having a boiling point preferably below 150° C., such as toluene, xylene, n-hexane, n-octane, isooctane and petroleum fractions, in a concentration of preferably 20–60% by weight siloxane content, higher or lower concentrations being included in the scope of the present invention.

In the process of the invention it is possible to use one kind of compound (1) or different kinds of compound (1). As compound (1) it is preferred to use such wherein $R^2$ is a trivalent hydrocarbon radical having preferably 1 to 25 carbon atoms per radical and x denotes a value of 3.

The organosiloxane (2) used in the process of the invention contains preferably two Si-bonded hydrogen atoms per molecule.

It is possible to use one kind of organosiloxanes (2) or different kinds of organosiloxane (2).

As organosiloxane (2) it is preferred to use such of the general formula $$HR_2SiO(SiR_2O)_nSiR_2H \quad (2)$$

where R denotes preferably identical or different, optionally halogenated hydrocarbon radicals having 1 to 6 carbon atoms per radical and n is 0 or an integer, more preferably an integer from 50 to 2000, in which case all integers between 0 and 2000 must be regarded as having been explicitly mentioned.

Examples of radicals R are alkyl radicals, such as the methyl, ethyl, n-propyl, isopropyl, 1-n-butyl, 2-n-butyl, isobutyl, tert-butyl, n-pentyl, isopentyl, neopentyl, tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical; cycloalkyl radicals, such as cyclopentyl, cyclohexyl, cycloheptyl and methylcyclohexyl radicals; aryl radicals, such as the phenyl, naphthyl, anthryl and phenanthryl radical; alkaryl radicals, such as o-, m-, p-tolyl radicals, xylyl radicals and ethylphenyl radicals; and aralkyl radicals, such as the benzyl radical, the α- and the β-phenylethyl radical.

Examples of substituted radicals R are haloalkyl radicals, such as the 3,3,3-trifluoro-n-propyl radical, the 2,2,2,2',2',2'-hexafluoroisopropyl radical, the heptafluoroisopropyl radical and haloaryl radicals, such as the o-, m-, and p-chlorophenyl radical.

Examples of alkyl radicals $R^3$ are the methyl, ethyl, n-propyl, isopropyl, 1-n-butyl, 2-n-butyl, isobutyl, tert-butyl, n-pentyl, isopentyl, neopentyl, tert-pentyl radical, hexyl radicals, such as the n-hexyl radical. $R^3$ is preferably a hydrogen atom.

Examples of compound (1) with which the siloxane copolymers of the invention containing alkenyl groups can be prepared are 1,3,5-trivinylcyclohexane, 3,5-dimethyl-4-vinyl- 1,6-heptadiene, 1,2,3,4-tetravinylcyclobutane, methyltrivinylsilane, tetravinylsilane, 1,1,2,2-tetraallyloxyethane, preference being given to 1,2,4-trivinylcyclohexane.

Examples of the radical $R^2$ are therefore preferably those of the formula

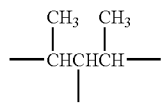

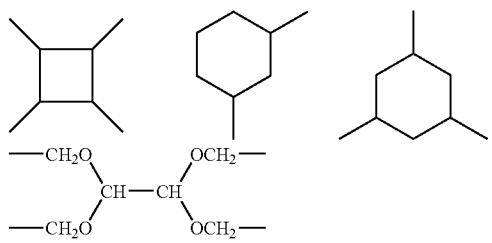

preference being given to the radical of the formula

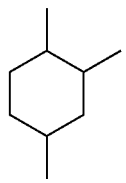

Organosiloxane (2) is used in the process of the invention in amounts such that the ratio of Si-bonded hydrogen in organosiloxane (2) to aliphatic double bond in compound (1) is from 1.3 to 10, preferably from 1.3 to 5.0, more preferably from 1.5 to 4.0, very preferably from 1.6 to 3.0.

Since organosiloxane (2) is used in excess, in the first step of the process preferably all of the aliphatic double bonds in the compound (1) therefore react, and siloxane copolymers are obtained containing Si-bonded hydrogen atoms.

The first step of the process, the reaction of compound (1), such as 1,2,4-trivinylcyclohexane, with organosiloxane (2), such as 1,3-dihydro-1,1,3,3-tetramethyldisiloxane, in excess in the presence of catalyst (3) can be represented by the following reaction scheme (1):

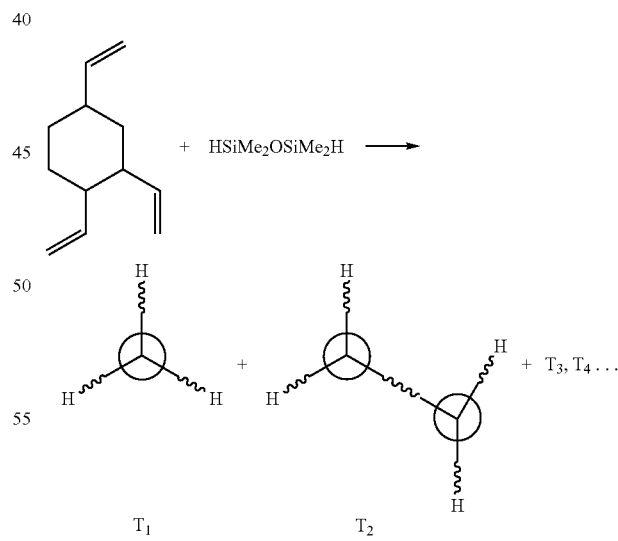

The siloxane copolymer mixture obtained includes a fraction of preferably more than 50% of individual compounds $T_3$ and $T_4$ and polymers with higher degrees of branching.

Depending on the stoichiometric ratio H—Si/C═C the siloxane copolymer mixture contains varying amounts of organosiloxane (2), which at low molecular weights can be removed under reduced pressure but otherwise remains as a component containing active hydrogen in the product mixture.

As catalysts which promote the addition of Si-bonded hydrogen onto aliphatic double bond it is possible in the process of the invention as well to use the same catalysts which it has also been possible to date to use for promoting the addition of Si-bonded hydrogen onto aliphatic double bond. The catalysts are preferably a metal from the group of the platinum metals or a compound or a complex from the group of the platinum metals. Examples of such catalysts are metallic and finely divided platinum, which may be on supports, such as silica, alumina or activated carbon, compounds or complexes of platinum, such as platinum halides, e.g., $PtCl_4$, $H_2PtCl_6.6H_2O$, $Na_2PtCl_4.4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6.6H_2O$, and cyclohexanone, platinum-vinylsiloxane complexes, such as platinum-1,3-divinyl-1,1,3,3-tetramethyldisiloxane complexes with or without a detectable inorganically bonded halogen content, bis(gamma-picoline)platinum dichloride, trimethylenedipyridineplatinum dichloride, dicyclopentadieneplatinum chloride, dimethyl-sulfoxide-ethyleneplatinum(II) dichloride, cyclooctadieneplatinum dichloride, norbornadieneplatinum dichloride, gamma-picolineplatinum dichloride, cyclopentadieneplatinum dichloride, and reaction products of platinum tetrachloride with olefin and primary amine or secondary amine or primary and secondary amine, such as the reaction product of platinum tetrachloride dissolved in 1-octene with sec-butylamine or ammonium-platinum complexes.

The catalyst (3) is used in the first process step preferably in amounts of from 0.5 to 100 ppm by weight (parts by weight per million parts by weight), more preferably in amounts of from 2 to 10 ppm by weight, calculated in each case as elemental platinum and based on the overall weight of compound (1) and organosiloxane (2).

The process according to the invention is preferably conducted at the pressure of the surrounding atmosphere, i.e., approximately at 1020 hPa (abs.), but may also be conducted at higher or lower pressures. Furthermore, the process according to the invention is conducted preferably at a temperature of from 20° C. to 150° C., more preferably from 20° C. to 120° C., particularly preferably from 20° C. to 100° C.

Since the organic compound (1) containing at least three aliphatic double bonds, e.g., 1,2,4-trivinylcyclohexane, tends toward polymerization at relatively high temperatures, it is possible in the process according to the invention preferably to use radical inhibitors, such as 4-methoxyphenol, 2,6-bis(tert-butyl)-4-methylphenol, phenothiazine, hydroquinone or pyrocatechol. The radical inhibitors are used preferably in amounts of from 10 to 500 ppm by weight, based on the overall weight of compound (1) and organosiloxane (2).

In the process according to the invention it is possible preferably to use inert organic solvents. Any inert organic solvents used may be removed by distillation after the reaction or may remain in the reaction mixture.

Alternatively to organic solvents it is possible to use inert silicone oils in the process according to the invention or to trade the organic solvent for such oils after the preparation of the branched siloxane copolymers of the invention.

For greater ease of handling it is also possible to trade organic solvents for reactive silicone oils after the preparation of the branched siloxane copolymers of the invention, by adding such oils to the reaction mixture and then removing the solvent by distillation. Preference is given to silicone oils having a viscosity of 100 mm²/s at 25° C. and Si-bonded hydrogen as reactive constituent.

The siloxane copolymers obtained containing Si-bonded hydrogen atoms may be equilibrated with organopolysiloxanes (4) in a further process step.

As organopolysiloxanes (4) it is preferred to use those selected from the group consisting of preferably linear organopolysiloxanes containing terminal triorganosiloxy groups, of the formula

$R_3SiO(SiR_2O)_rSiR_3$, where R is as defined above and
r is 0 or an integer whose value is preferably from 1 to 1500, more preferably from 10 to 300,
linear organopolysiloxanes containing terminal hydroxyl groups, of the formula

$HO(SiR_2O)_sH$ where R is as defined above and
s is an integer whose value is preferably from 1 to 1500, more preferably from 10 to 300,
branched organopolysiloxanes optionally containing hydroxyl groups, comprising units of the formula

$R_3SiO_{1/2}$, $R_2SiO$ and $RSiO_{3/2}$ where R is as defined above,
cyclic organopolysiloxanes of the formula

$(R_2SiO)_t$ where R is as defined above and
t is an integer from 3 to 12,
and copolymers comprising units of the formula

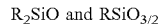

$R_2SiO$ and $RSiO_{3/2}$ where R is as defined above.

Preferred organopolysiloxanes (4) are preferably those of the formulae $R_3SiO(SiR_2O)_rSiR_3$, $HO(SiR_2O)_sH$ and $(R_2SiO)_t$, particular preference being given to those of the formula $R_3SiO(SiR_2O)_rSiR_3$.

The proportion of the organopolysiloxanes (4) used in the optional equilibration and siloxane copolymers containing Si-bonded hydrogen atoms is determined merely by the desired fraction of the Si-bonded hydrogen atoms in the siloxane copolymers produced in the course of the optional equilibration, and by the desired average chain length.

In the course of the optional equilibration, it is preferred to use basic or acidic catalysts which promote the equilibration. Examples of such catalysts are preferably alkali metal hydroxides, such as sodium hydroxide, potassium hydroxide, and cesium hydroxide, trimethylbenzylammonium hydroxide, and tetramethylammonium hydroxide. Alkali metal hydroxides are preferred. Alkali metal hydroxides are used preferably in amounts of from 50 to 10,000 ppm by weight (=parts per million), in particular from 500 to 2000 ppm by weight, based in each case on the overall weight of the siloxane copolymers containing Si-bonded hydrogen atoms and organopolysiloxanes (4) used.

Examples of acidic catalysts are preferably sulfuric acid, phosphoric acid, trifluoromethanoic acid, phosphorus nitride chlorides, and acidic catalysts which are solid under the reaction conditions, such as acid-activated bleaching earth, acidic zeolites, sulfonated charcoal, and sulfonated styrene-divinylbenzene copolymer. Phosphorus nitride chlorides are preferred. Phosphorus nitride chlorides are used preferably in amounts of from 5 to 1000 ppm by weight (=parts per million), in particular from 50 to 200 ppm by weight, based in each case on the overall weight of the organosilicon compounds used.

The optional equilibration is conducted preferably at from 100° C. to 150° C. and under the pressure of the surrounding atmosphere, i.e., approximately at 1020 hPa (abs.). If desired, however, it is also possible to employ higher or lower pressures. The equilibration is preferably conducted in from 5 to 20% by weight, based on the overall weight of the respective siloxane copolymers containing Si-bonded hydrogen atoms and organopolysiloxanes (4) used, in water-immiscible solvent, such as toluene. The catalyst can be deactivated before the equilibration mixture is worked up.

The process of the invention can be conducted batchwise, semicontinuously or fully continuously.

As antimisting additives it is preferred to use those alkenyl-functional siloxane copolymers which are prepared without a further equilibration step and have a particularly high level of branching. Preferred additives are obtained from operating in the particularly preferred stoichiometric ranges indicated.

For reducing the formation of aerosol the antimisting additives of the invention are added to the crosslinkable silicone coating compositions.

The antimisting additives of the invention, the alkenyl-functional siloxane copolymers, are used in the crosslinkable silicone coating compositions preferably in amounts of from 0.5 to 10% by weight, more preferably from 1 to 5% by weight, based on the overall weight of the crosslinkable silicone coating compositions.

As crosslinkable silicone coating compositions it is preferred to use those comprising (A) organosilicon compounds having radicals containing aliphatic carbon-carbon multiple bonds, (B) organosilicon compounds containing Si-bonded hydrogen atoms, (C) catalysts which promote the addition of Si-bonded hydrogen onto aliphatic multiple bond, and if desired (D) inhibitors.

The invention further provides crosslinkable silicone coating compositions featuring reduced aerosol formation, comprising (X) antimisting additives of the invention, (A) organosilicon compounds having radicals containing aliphatic carbon-carbon multiple bonds, (B) organosilicon compounds containing Si-bonded hydrogen atoms, (C) catalysts which promote the addition of Si-bonded hydrogen onto aliphatic multiple bond, and if desired (D) inhibitors.

For the crosslinkable silicone coating compositions it is possible with preference to use one kind of the antimisting additive (X) of the invention or different kinds of the antimisting additive (X) of the invention.

As organopolysiloxanes (A) having radicals containing aliphatic carbon-carbon multiple bonds it is preferred to use linear or branched organopolysiloxanes comprising units of the general formula

where $R^5$ is a monovalent, unsubstituted or substituted, hydrocarbon radical having from 1 to 18 carbon atoms per radical and being free from aliphatic carbon-carbon multiple bonds and $R^6$ is a monovalent hydrocarbon radical having from 2 to 8 carbon atoms per radical and containing a terminal aliphatic carbon-carbon multiple bond, z is 0, 1, 2 or 3, y is 0, 1 or 2 and the sum z+y is 0, 1, 2 or 3, with the proviso that there are on average at least 1.5 radicals $R^6$, preferably on average at least 2 radicals $R^6$.

Preferred organosilicon compounds (A) are organopolysiloxanes of the general formula

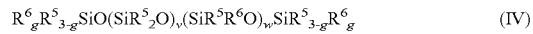

where $R^5$ and $R^6$ are as defined above, g is 0, 1 or 2, v is 0 or an integer from 1 to 1500, and w is 0 or an integer from 1 to 200, with the proviso that on average at least 1.5 radicals $R^6$, preferably on average at least 2 radicals $R^6$, are present.

In the context of this invention formula (IV) is to be understood to mean that v units —(SiR$^5_2$O)— and w units —(SiR$^5$R$^6$O)— may be distributed arbitrarily in the organopolysiloxane molecule.

As organosilicon compounds (A) it is also possible to use branched polymers containing terminal ω-alkenyl groups, preferably Si-bonded vinyl groups, as described in U.S. Pat. No. 6,034,225 (incorporated by reference), especially column 1 line 43 to column 2 line 13, and U.S. Pat. No. 6,258,913 (incorporated by reference), especially column 1 line 62 to column 2 line 35.

As organosilicon compounds (A) it is also possible to use linear organopolysiloxanes as described in U.S. Pat. No. 6,274,692 (incorporated by reference), especially column 2 lines 3 to 27, which do not have an aliphatically unsaturated hydrocarbon radical, such as an Si-bonded vinyl group, at both ends but instead also have aliphatically saturated hydrocarbon radicals, such as Si-bonded methyl groups, at the ends.

As organosilicon compounds (A) it is also possible to use those as described in U.S. Pat. No. 5,241,034 (incorporated by reference), especially column 16, line 23 to column 17, line 35, DE-A 195 22 144 (incorporated by reference), especially page 2 lines 44 to 67, DE-A 196 29 053 (incorporated by reference), especially page 2 line 51 to page 3 line 29, U.S. Pat. No. 5,760,145 (incorporated by reference), especially column 2 line 46 to column 4 line 23 and U.S. Pat. No. 6,265,497 (incorporated by reference), especially column 2 lines 3 to 47.

The organopolysiloxanes (A) preferably possess an average viscosity of from 100 to 10,000 mPa·s at 25° C.

Examples of hydrocarbon radicals $R^5$ are alkyl radicals, such as the methyl, ethyl, n-propyl, isopropyl, 1-n-butyl, 2-n-butyl, isobutyl, tert-butyl, n-pentyl, isopentyl, neopentyl, tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical; cycloalkyl radicals, such as cyclopentyl, cyclohexyl, cycloheptyl radicals and methylcyclohexyl radicals, aryl radicals, such as the phenyl, naphthyl, anthryl and phenanthryl radical; alkaryl radicals, such as o-, m-, p-tolyl radicals, xylyl radicals and ethylphenyl radicals, and aralkyl radicals, such as the benzyl radical, the α- and the β-phenylethyl radical.

Examples of radicals $R^6$ are alkenyl radicals, such as the vinyl, 5-hexenyl, allyl, 3-butenyl and 4-pentenyl radical; and alkynyl radicals, such as the ethynyl, propargyl and 1-propyne radical.

As organosilicon compounds (B) which contain Si-bonded hydrogen atoms it is preferred to use linear, cyclic or branched organopolysiloxanes comprising units of the general formula

 (V)

where
$R^5$ is as defined above,
e is 0, 1, 2 or 3,
f is 0, 1 or 2
and the sum of e+f is 0, 1, 2 or 3,
with the proviso that there are on average at least two Si-bonded hydrogen atoms.

The organosilicon compounds (B) preferably contain at least three Si-bonded hydrogen atoms.

As organosilicon compounds (B) it is more preferred to use organopolysiloxanes of the general formula

 (VI)

where $R^5$ is as defined above,
h is 0, 1 or 2,
o is 0 or an integer from 1 to 1500, and
p is 0 or an integer from 1 to 200,
with the proviso that there are on average at least 2 Si-bonded hydrogen atoms.

In the context of this invention formula VI is to be understood to mean that o units —$(SiR^5{}_2O)$— and p units —$(SiR^5HO)$— may be distributed arbitrarily in the organopolysiloxane molecule.

Examples of such organopolysiloxanes are, in particular, copolymers comprising dimethylhydrosiloxane, methylhydrosiloxane, dimethylsiloxane and trimethylsiloxane units, copolymers comprising trimethylsiloxane, dimethylhydrosiloxane and methylhydrosiloxane units, copolymers comprising trimethylsiloxane, dimethylsiloxane and methylhydrosiloxane units, copolymers comprising methylhydrosiloxane and trimethylsiloxane units, copolymers comprising methylhydrosiloxane, diphenylsiloxane and trimethylsiloxane units, copolymers comprising methylhydrosiloxane, dimethylhydrosiloxane and diphenylsiloxane units, copolymers comprising methylhydrosiloxane, phenylmethylsiloxane, trimethylsiloxane and/or dimethylhydrosiloxane units, copolymers comprising methylhydrosiloxane, dimethylsiloxane, diphenylsiloxane, trimethylsiloxane and/or dimethylhydrosiloxane units, and copolymers comprising dimethylhydrosiloxane, trimethylsiloxane, phenylhydrosiloxane, dimethylsiloxane and/or phenylmethylsiloxane units.

As organosilicon compounds (B) it is also possible to use those as described in U.S. Pat. No. 5,691,435 (incorporated by reference), especially column 3 line 45 to column 4 line 29.

The organopolysiloxanes (B) preferably possess an average viscosity of from 10 to 1000 mPa·s at 25° C.

Organosilicon compound (B) is used preferably in amounts of from 0.5 to 3.5, more preferably from 1.0 to 3.0, gram atoms of Si-bonded hydrogen per mole of Si-bonded radical containing aliphatic carbon-carbon multiple bond in the organosilicon compound (A).

In the case of the crosslinkable silicone coating compositions as well it is possible, as catalysts which promote the addition of Si-bonded hydrogen onto aliphatic multiple bonds, to use the same catalysts which it has also been possible to use to date to promote the addition of Si-bonded hydrogen onto aliphatic multiple bond. As constituent (C) it is preferred to use the above-mentioned catalysts (3).

The catalysts (C) are used preferably in amounts of from 10 to 1000 ppm by weight (parts by weight per million parts by weight), more preferably from 50 to 200 ppm by weight, calculated in each case as elemental platinum metal and based on the overall weight of the organosilicon compounds (A) and (B).

The crosslinkable silicone coating compositions may comprise agents which retard the addition of Si-bonded hydrogen onto aliphatic multiple bond at room temperature, known as inhibitors (D).

For the crosslinkable silicone coating compositions as well it is possible as inhibitors (D) to use all inhibitors which it has also been possible to use to date for the same purpose. Examples of inhibitors (D) are 1,3-divinyl-1,1,3,3-tetramethyldisiloxane, benzotriazole, dialkylform-amides, alkylthioureas, methyl ethyl ketoxime, organic compounds or organosilicon compounds having a boiling point of at least 25° C. at 1012 mbar (abs.) and containing at least one aliphatic triple bond, such as 1-ethynylcyclohexan-1-ol, 2-methyl-3-butyn-2-ol, 3-methyl-1-pentyn-3-ol, 2,5-dimethyl-3-hexyne-2,5-diol and 3,5-dimethyl-1-hexyn-3-ol, 3,7-dimethyloct-1-yn-6-en-3-ol, a mixture of diallyl maleate and vinyl acetate, maleic monoesters, and inhibitors such as the compound of the formula HC≡C—C(CH$_3$)(OH)—CH$_2$—CH$_2$—CH=C(CH$_3$)$_2$, available commercially under the trade name "Dehydrolinalool" from BASF.

Where inhibitor (D) is used, it is employed appropriately in amounts of preferably from 0.01 to 10% by weight, more preferably from 0.01 to 3% by weight, based on the overall weight of the organosilicon compounds (A) and (B).

Examples of further constituents which may be used in the crosslinkable silicone coating compositions are agents for adjusting the release force, organic solvents, adhesion promoters, and pigments.

Examples of agents for adjusting the release force of the coatings, repellent to tacky substances, that are produced with the compositions of the invention are silicone resins comprising units of the formula

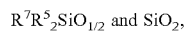

known as MQ resins, where $R^7$ is a hydrogen atom, a hydrocarbon radical $R^5$, such as methyl radical, an alkenyl radical $R^6$, such as vinyl radical, and $R^5$ and $R^6$ are as defined above, and the units of the formula $R^7R^5{}_2SiO_{1/2}$ may be identical or different. The ratio of units of the formula $R^7R^5{}_2SiO_{1/2}$ to units of the formula $SiO_2$ is preferably from 0.6 to 2. The silicone resins are used preferably in amounts of from 5 to 80% by weight, based on the overall weight of the organosilicon compounds (A) and (B).

Examples of organic solvents are petroleum spirits, e.g., mixtures of alkanes having a boiling range of from 70° C. to 180° C., n-heptane, benzene, toluene and xylenes, halogenated alkanes having from 1 to 6 carbon atoms, such as methylene chloride, trichloroethylene and perchloroethylene, ethers, such as di-n-butyl ether, esters, such as ethyl acetate, and ketones, such as methyl ethyl ketone and cyclohexanone.

Where organic solvents are used, they are employed appropriately in amounts of preferably from 10 to 90% by weight, more preferably from 10 to 70% by weight, based on the overall weight of the organosilicon compounds (A) and (B).

Although the sequence when mixing the constituents (X), (A), (B), (C) and, where used, (D) is not critical, it has nevertheless been found appropriate for practical purposes to add constituent (C), viz the catalyst, last to the mixture of the other constituents.

The crosslinking of the compositions of the invention takes place preferably at from 70° C. to 180° C. As energy sources for thermal crosslinking it is preferred to use ovens, e.g., forced air drying ovens, heating tunnels, heated rollers, heated plates, or heat rays from the infrared region.

As well as thermally, the compositions of the invention may also be crosslinked by irradiation with ultraviolet light or by irradiation with UV and IR light. As ultraviolet light it is common to use that having a wavelength of 253.7 nm. In commerce there are a large number of lamps which emit ultraviolet light having a wavelength of from 200 to 400 nm and which preferentially emit ultraviolet light having a wavelength of 253.7 nm.

The invention further provides shaped bodies produced by crosslinking the compositions of the invention.

The shaped bodies preferably comprise coatings, more preferably coatings which repel tacky substances.

The invention further provides a process for producing coatings by applying crosslinkable compositions of the invention to the surfaces that are to be coated and then crosslinking the compositions.

The crosslinkable compositions of the invention are used preferably for producing coatings which repel tacky substances, e.g., for producing release papers. Coatings which repel tacky substances are produced by applying crosslinkable compositions of the invention to the surfaces that are to be made repellent to tacky substances and then crosslinking the compositions.

The application of the compositions of the invention to the surfaces to be coated, preferably surfaces to be made repellent to tacky substances, may be accomplished in any desired manner which is suitable and widely known for the production of coatings from liquid materials; for example, by dipping, brushing, pouring, spraying, rolling, printing, by means of an offset gravure coating apparatus, for example, blade or knife coating, or by means of an airbrush.

The coat thickness on the coated surfaces is preferably from 0.3 to 6 µm, with particular preference from 0.5 to 2.0 µm.

The surfaces to be coated, preferably surfaces to be made repellent to tacky substances, which may be treated in the context of the invention may be surfaces of any materials which are solid at room temperature and 1012 mbar (abs.).

Examples of surfaces of this kind are those of paper, wood, cork, and polymer films, e.g., polyethylene films or polypropylene films, woven and nonwoven fabric of natural or synthetic fibers, ceramic articles, glass, including glass fibers, metals, polyethylene-coated paper, and boards, including those of asbestos. The above-mentioned polyethylene may in each case be high-pressure, medium-pressure or low-pressure polyethylene. In the case of paper the paper in question may be of a low-grade kind, such as absorbent papers, including kraft paper which is in the raw state, i.e., has not been pretreated with chemicals and/or natural polymeric substances, and which has a weight of from 60 to 150 g/m$^2$, unsized papers, papers of low freeness value, mechanical papers, unglazed or uncalendered papers, papers which are smooth on one side owing to the use of a dry glazing cylinder during their production, without additional complex measures, and which are therefore referred to as "machine-glazed papers", uncoated papers or papers produced from waste paper, i.e., what are known as recycled papers. The paper to be treated in accordance with the invention may also of course, however, comprise high-grade paper types, such as low-absorbency papers, sized papers, papers of high freeness value, chemical papers, calendered or glazed papers, glassine papers, parchmentized papers or precoated papers. The boards as well may be of high or low grade.

The compositions of the invention are suitable, for example, for producing release, backing, and interleaving papers, including interleaving papers which are employed in the production of, for example, cast films or decorative films, or of foam materials, including those of polyurethane. The compositions of the invention are also suitable, for example, for producing release, backing, and interleaving cards, films, and cloths, for treating the reverse sides of self-adhesive tapes or self-adhesive sheets or the written faces of self-adhesive labels. The compositions of the invention are additionally suitable for treating packing material, such as that comprising paper, cardboard boxes, metal foils and drums, e.g., cardboard, plastic, wood or iron, which is intended for storing and/or transporting tacky goods, such as adhesives, sticky foodstuffs, e.g., cakes, honey, candies, and meat; bitumen, asphalt, greased materials, and crude rubber. A further example of the application of the compositions of the invention is the treatment of carriers for transferring pressure-sensitive adhesive films in the context of what is known as the transfer process.

The crosslinkable silicone coating compositions comprising the antimisting additives of the invention are especially suitable for use in rapid coating systems with coating speeds of preferably from 300 to 2000 m/min, more preferably from 400 to 1500 m/min, in which the compositions of the invention are applied at high speeds to the surfaces that are to be coated.

The compositions of the invention are suitable for producing the self-adhesive materials joined to the release paper, both by the offline method and by the inline method.

In the offline method, the silicone composition is applied to the paper and crosslinked, and then, in a subsequent stage, normally after the winding of the release paper onto a roll and after the storage of the roll, an adhesive film, present for example on a label face paper, is applied to the coated paper and the composite is then compressed. In the inline method the silicone composition is applied to the paper and crosslinked, the silicone coating is coated with the adhesive, the label face paper is then applied to the adhesive, and the composite, finally, is compressed.

In the case of the offline method the winding speed is governed by the time needed to render the silicone coating tack-free. In the case of the inline method the process speed is governed by the time needed to render the silicone coating migration-free. With the compositions of the invention the offline method and the inline method can be operated at speeds from 300 to 2000 m/min, preferably from 400 to 1500 m/min.

Preparation of the Alkenyl-Functional Siloxane Copolymers:

EXAMPLE 1

At 25° C. the following components are mixed homogeneously: 1259.3 g of an α,ω-dihydrosiloxane having an Si-bonded hydrogen (active hydrogen) content of 0.054% by weight, 1280.9 g of trimethylsilyl-terminated polydimethylsiloxane of viscosity 9.8 mm$^2$/s at 25° C. and 21.6 g of trivinylcyclohexane (SiH/C=C=1.7).

Then 0.25 g of a 1% strength by weight (based on elemental platinum) solution of a platinum-1,3-divinyl-1,1,3,3-tetramethyldisiloxane complex in an α,ω-divinyldimethylpolysiloxane having a viscosity of 1000 mPa·s at 25° C. (a solution of the catalyst known as the Karstedt catalyst, whose preparation is described in U.S. Pat. No. 3,775,452) is added. Over 1 h the mixture temperature rises by about 8° K. Thereafter stirring is continued at 100° C. for 1 h. This gives a clear solution of a branched siloxane polymer having SiH functions in the same amount of trimethylsilyl-terminated polydimethylsiloxane having a viscosity of 230 mm$^2$/s at 25° C. The solution is infinitely miscible with vinyl-functional polysiloxanes.

EXAMPLE 2

At 25° C. the following components are mixed homogeneously: 799.2 g of an α,ω-dihydrosiloxane having an active hydrogen content of 0.0106%, 801.9 g of trimethylsilyl-terminated polydimethylsiloxane of viscosity 9.8 mm$^2$/s at 25° C. and 2.7 g of trivinylcyclohexane (SiH/C=C=1.7). Then 0.3 g of the Karstedt catalyst solution described in example 1, with a platinum content of 1.0%, is added. The mixture is stirred for 1 h, during which the mixture temperature rises hardly at all. Thereafter the mixture is stirred at 40° C. for 1 h. This gives a clear solution of a branched siloxane polymer having SiH functions in the same amount of trimethylsilyl-terminated polydimethylsiloxane having a viscosity of about 10,000 mm$^2$/s at 25° C.

EXAMPLE 3

At 25° C. the following components are mixed homogeneously: 799.2 g of an α,ω-dihydrosiloxane having an active hydrogen content of 0.0106%, 802 g of toluene and 2.7 g of trivinylcyclohexane (SiH/C=C=1.7).

Then 0.3 g of the Karstedt catalyst solution, with a platinum content of 1.0%, described in example 1 is added. The mixture is stirred for 1 h, during which there is hardly any rise in the mixture temperature. Thereafter the mixture is stirred at 40° C. for 1 h. The toluene is then removed under reduced pressure and replaced by the same amount of 1-dodecene. This gives a clear solution of a branched siloxane polymer having SiH functions in 1-dodecene, with a viscosity of 2700 mm$^2$/s at 25° C. The solution is infinitely miscible with vinyl-functional polysiloxanes.

2. Use of the Alkenyl-Functional Siloxane Copolymers as Antimisting Additives:

EXAMPLE 4

At a high application weight and with certain coating formulations, aerosol may be formed even at machine speeds well below 500 m/min. The branched siloxane copolymers of the invention were used, for reducing the formation of aerosol, as additives in crosslinkable silicone coating systems for use in such coating processes.

The standard formulation used was a mixture of 100 parts by weight of a branched polysiloxane containing vinyldimethylsiloxy end groups, having a viscosity of 420 mPa·s (25° C.) and an iodine number of 8.0, prepared in accordance with Example 3 of U.S. Pat. No. 6,034,225, 3.6 parts by weight of a linear polysiloxane comprising hydromethylsiloxane and trimethylsiloxane units in a molar ratio of 24:1, 1.04 parts by weight of a 1% strength by weight (based on elemental platinum) solution of a platinum-1,3-divinyl-1,1,3,3-tetramethyldisiloxane complex in an α,ω-divinyldimethylpolysiloxane having a viscosity of 1000 mPa·s at 25° C., and 0.3 part by weight of 1-ethynylcyclohexanol.

The additives of the invention from the preparation examples indicated in table 1 were added to the standard formulation in the amounts specified in table 1. As a control, a standard formulation without inventive additive was used. These mixtures were used for coating paper.

The substrate used was paper from Ahlstrom bearing the designation Glassine Larice Tipo 325, 62 g/m$^2$. Coating was carried out on the pilot coating unit from Dixon with the model number 1060, having a 5-roll applicator unit, at 150 m/min. The application roller was run at 95% of the paper speed. The coating was cured in a drying oven with a length of 3 m at 140° C.

The formation of aerosol was determined using the Dusttrak Aerosol Monitor Model 8520. Samples were taken between the silicone application roll and the roll nip at a distance of 12 cm from the silicone application roll. Additionally, the formation of aerosol was assessed visually and evaluated with the codes 1–3:

| | |
|---|---|
| 1 | no visible aerosol formation |
| 2 | slightly visible aerosol formation |
| 3 | severe aerosol formation. |

During the coating experiments, the maximum indicated aerosol levels were recorded. The coating weight was determined by means of X-ray fluorescence analysis in reference to an appropriate standard, and was 4 g/m$^2$.

Furthermore, the effect of the antimisting additives according to the invention on the curing of the coating system was determined by means of a migration test. The migration is assessed, in accordance with its extent, using ratings 1 to 6, with rating 1 denoting no migration (complete curing), rating 3 slight migration and rating 6 severe migration (incomplete curing). The migration test is described in the brochure DEHESIVE® Silicones Test Methods from Wacker-Chemie GmbH.

The results are summarized in table 1.

TABLE 1

| Additive | Amount of additive in % | Misting, mg/m$^3$ (Dusttrak) | Misting (visual) | Migration |
|---|---|---|---|---|
| Example 1 | 4 | 11 | 2.5 | 2.5 |
| Example 2 | 4 | 1.15 | 1 | 1.5 |
| Example 3 | 4 | 2.1 | 1 | 1 |
| Example 3 | 1 | 3.5 | 1 | 1.5 |
| — | — | 17 | 3 | 2 |

The comparative experiments show that the addition of the branched siloxane copolymers containing Si-bonded hydrogen atoms of the invention, as antimisting additives markedly reduces the formation of aerosol by crosslinkable silicone coating systems in rapid coating processes.

The invention claimed is:

1. A process for reducing the formation of aerosol in a crosslinkable silicone coating composition, comprising adding to the coating composition, from 0.5 to 10 weight percent of a siloxane copolymer antimisting additive siloxane containing Si-bonded hydrogen atoms, prepared by reacting at least one compound (1) containing at least three aliphatic double bonds, of the formula $$R^2(CR^3{=}CH_2)_x \quad (1)$$

where $R^2$ is a trivalent or tetravalent hydrocarbon radical optionally containing one or more non-adjacent heteroatoms selected from the group consisting of oxygen, silicon and titanium, $R^3$ is a hydrogen atom or an alkyl radical having from 1 to 6 carbon atoms per radical, and x is 3 or 4, with at least one organosiloxane (2) having terminal Si-bonded hydrogen atoms, in the presence of a catalyst (3) which promotes the addition of Si-bonded hydrogen onto an aliphatic double bond, the ratio of Si-bonded hydrogen in the organosiloxane (2) to aliphatic double bond in organic compound (1) being from 1.3 to 10;

and wherein the product is not subsequently equilibrated.

2. The process of claim 1, wherein $R^2$ contains from 1 to 25 carbon atoms.

3. The process of claim 1, wherein said organosiloxane (2) has the formula $$HR_2SiO(SiR_2O)_nSiR_2H \quad (2)$$

where each R independently is an identical or different, optionally halogenated hydrocarbon radical having 1 to 6 carbon atoms per radical and n is 0 or an integer greater than zero.

4. The process of claim 3, wherein n is an integer from 50 to 2000.

5. The process of claim 1, wherein $R^2$ is a trivalent hydrocarbon radical having 1 to 25 carbon atoms per radical, and x is 3.

6. The process of claim 1, wherein said organic compound (1) comprises 1,2,4-trivinylcyclohexane.

7. The process of claim 1, wherein the ratio of Si-bonded hydrogen in organopolysiloxane (2) to aliphatic double bonds in organic compound (1) is from 1.6 to 3.0.

8. The process of claim 1, wherein said crosslinkable silicone coating composition comprises (A) at least one organosilicon compound bearing radicals containing one or more aliphatic carbon—carbon multiple bonds, (B) at least one organosilicon compound containing Si-bonded hydrogen atoms, (C) and optionally, (D) one or more inhibitors, wherein said component B is other than said antimisting additive.

9. A crosslinkable silicone coating composition having a reduced aerosol formation, comprising (X) at least one antimisting additive as defined in claim 1, present in an amount of from 0.5 to 10 weight percent based on the total weight of the coating composition, (A) at least one organosilicon compound bearing radicals containing one or more aliphatic carbon—carbon multiple bonds, (B) at least one organosilicon compound containing Si-bonded hydrogen atoms, different from said antimisting additive(s), (C) at least one catalyst which promotes the addition of Si-bonded hydrogen onto aliphatic multiple bonds, and optionally, (D) one or more inhibitors.

10. A shaped body produced by crosslinking the composition of claim 9.

11. The shaped body of claim 10, which is a coating.

12. The shaped body of claim 10, wherein said coating is a release coating for tacky substances.

13. A process for producing coatings, comprising applying the crosslinkable composition of claim 9 to a surface to be coated, and crosslinking the crosslinkable composition.

14. A process for producing coatings which are release coatings for tacky substances, comprising applying the crosslinkable composition of claim 9 to a surface and crosslinking the crosslinkable composition.

15. A process for reducing the formation of aerosol in a crosslinkable silicone coating composition, comprising adding to the coating composition from 0.5 to 10 weight percent, based on total coating composition weight, of a siloxane copolymer antimisting additive siloxane containing Si-bonded hydrogen atoms, prepared by reacting at least one compound (1) containing at least three aliphatic double bonds, of the formula $$R^2(CR^3{=}CH_2)_x \quad (1)$$

where $R^2$ is a trivalent or tetravalent hydrocarbon radical optionally containing one or more non-adjacent heteroatoms selected from the group consisting of oxygen, silicon and titanium, $R^3$ is a hydrogen atom or an alkyl radical having from 1 to 6 carbon atoms per radical, and x is 3 or 4, with at least one organosiloxane (2) having terminal Si-bonded hydrogen atoms, in the presence of a catalyst (3) which promotes the addition of Si-bonded hydrogen onto an aliphatic double bond, the ratio of Si-bonded hydrogen in the organosiloxane (2) to aliphatic double bond in organic compound (1) being from 1.3 to 10;

and in a second step, equilibrating a resulting siloxane copolymer containing Si-bonded hydrogen atoms, with one or more organopolysiloxane(s) (4) selected from the group consisting of linear organopolysiloxanes containing terminal triorganosiloxy groups of the formula $$R_3SiO(SiR_2O)_rSiR_3$$

where R are identical or different optionally halogenated hydrocarbon radicals and r is a 0 or an integer from 1 to 1500; linear organopolysiloxanes containing terminal hydroxyl groups of the formula $$HO(SiR_2O)_sH$$

where R is as defined previously and s is an integer from 1 to 1500; branched organopolysiloxanes optionally containing hydroxyl groups consisting of units of the formula $$R^3SiO_{1/2}, R_2SiO, \text{and } RSiO_{3/2}$$

wherein some R in the above formula are replaced by —OH; cyclic organopolysiloxanes of the formula

where R is as defined above and t is an integer from 3 to 12; and copolymers consisting of units, of the formula

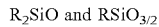

where R is as defined above.

16. The process of claim 15, wherein the antimisting additive is present in an amount of from 1 to 5 weight percent.

17. A crosslinkable silicone coating composition having a reduced aerosol formation, comprising
(X) at least one antimisting additive as defined in claim 15, present in an amount of from 0.5 to 10 weight percent based on the total weight of the coating composition,
(A) at least one organosilicon compound bearing radicals containing one or more aliphatic carbon—carbon multiple bonds,
(B) at least one organosilicon compound containing Si-bonded hydrogen atoms, different from said antimisting additive(s),
(C) at least one catalyst which promotes the addition of Si-bonded hydrogen onto aliphatic multiple bonds, and optionally,
(D) one or more inhibitors.

18. The coating composition of claim 17, wherein said antimisting additive (X) is present in an amount of from 1 to 5 weight percent.

* * * * *